March 11, 1969 H. GOTT ET AL 3,431,952
DEVICES FOR ADJUSTING THE TRANSVERSE WIRE
SPACING IN WIRE MESH WELDING MACHINES
Filed Jan. 24, 1967 Sheet 1 of 2

INVENTORS:
Hans Gött and
Josef Ritter,

BY

THEIR ATTORNEY.

United States Patent Office 3,431,952
Patented Mar. 11, 1969

3,431,952
DEVICES FOR ADJUSTING THE TRANSVERSE WIRE SPACING IN WIRE MESH WELDING MACHINES
Hans Gott, Graz, and Josef Ritter, Graz-Kroisbach, Austria, assignors to EVG Entwicklungs- und Verwertungsgesellschaft m.b.H., Graz, Austria, a corporation of Austria
Filed Jan. 24, 1967, Ser. No. 611,413
Claims priority, application Austria, Jan. 31, 1966,
A 856/66
U.S. Cl. 140—112        14 Claims
Int. Cl. B21f 15/08; B23k 11/10; B21b 37/14

ABSTRACT OF THE DISCLOSURE

A wire mesh making machine has a control system, including cam and cam follower means, that provides for an abrupt change in the spacing of the transverse wires without need to stop the machine.

---

Figure 1:
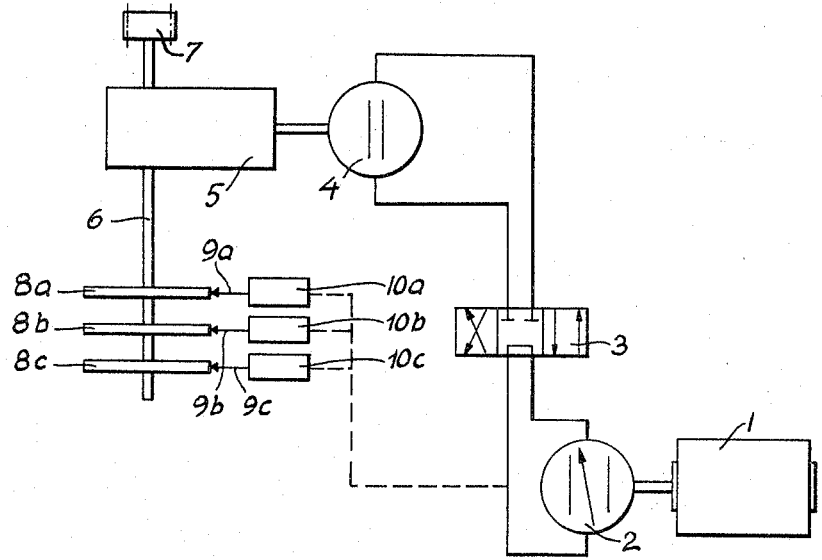

The invention relates to an adjustment device for changing the transverse wire spacing in the manufacture of welded wire mesh in a wire mesh welding machine of the kind which welds longitudinal and transverse wires together at their crossover points, the longitudinal wires being advanced intermittently through the machine by an advancing mechanism which has grippers which grip each welded transverse wire and advances it through the required distance and then return to grip the next welded transverse wire, and the working stroke of the advancing mechanism, which determines the spacing between the welded transverse wires, being determined by the adjustable angular orientation of a shaft of the adjustment device.

An advancing mechanism and corresponding adjustment device for intermittently advancing the transverse wires is described for example in the Austrian patent specification No. 186,940, where the parts of the advancing mechanism are moved by a combination of cranks and toggle levers, whereby the length of the stroke of the advancing mechanism is continuously adjustable by shifting the centre of rotation of a toggle lever. However various other driving mechanisms may be used to give the advancing movement, for example involving cranks with crank arms of variable length. In all these cases the stroke of the advance can be adjusted by means of a rotatable device whose angular position is adjustable, for example a toothed pinion or a toothed segment. This device has hitherto been actuated by hand by means of a hand wheel, but this either requires that the machine must be stopped before the adjustment can be made, or if the machine is left running during the adjustment the change to a different transverse wire spacing takes place gradually, because the period required for making the adjustment is considerably longer than the period required by the machine for completing an advancing stroke.

However it is often desired when manufacturing wire mesh to change over abruptly from one transverse wire spacing to another, and this without stopping the machine. This abrupt change is necessary for example in the manufacture of reinforcement mesh for concrete structures where the mesh is laid with overlapping ends. In order to obtain short overlaps, to economize in material, while still providing the specified overlap coverage, the transverse wire spacing must be decreased abruptly in this way.

The object of the invention is to provide an adjustment device for changing the transverse wire spacing in the manufacture of welded mesh and for fitting to a wire mesh welding machine of the kind described, in such a way that the necessary change from one wire spacing to the next is effected automatically and during a period of time shorter than that required for the advancing mechanism to return so that the entire changeover process can take place during the pause between two successive welding operations, that is to say an abrupt change of spacing must occur without being necessary to stop the machine.

According to the invention, such an adjustment device comprises a shaft on which there are mounted two or more cam discs, each of said cam discs being angularly adjustable with regard to said shaft, a cam follower in engagement with each of said cam discs, a coupling device connecting each cam follower to a servo system, these coupling devices being arranged in such a way that any one of them may selectively be rendered operative, while all the others remain inactive, and a servo system which rotates the shaft to which the cam discs are secured, through an angle dependent upon the angular setting on the shaft of that one cam disc which at the moment of the operation has been selected to be in operative connection with the servo system.

The appropriate coupling of cam and cam follower required for the particular change of spacing can if desired be effected manually but preferably it is done by an automatic programming system.

Figure 2:
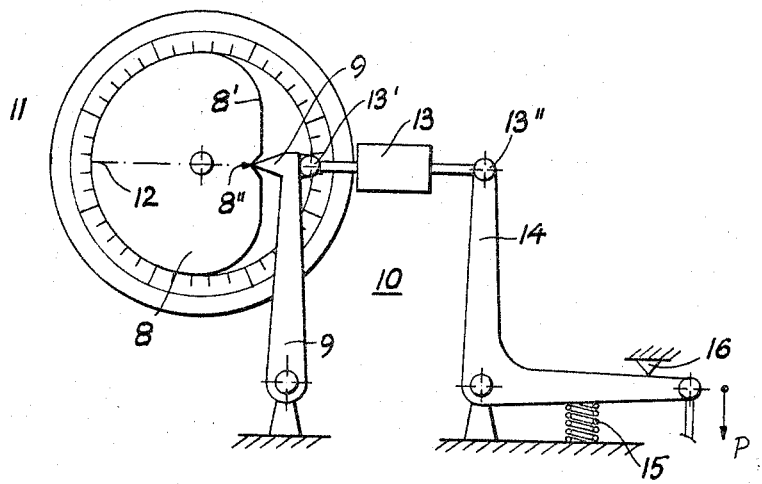
Figure 3:
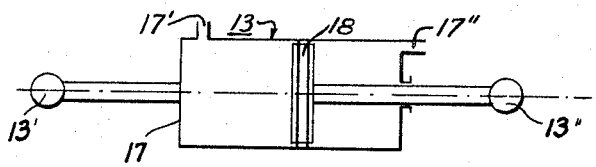
Figure 4:
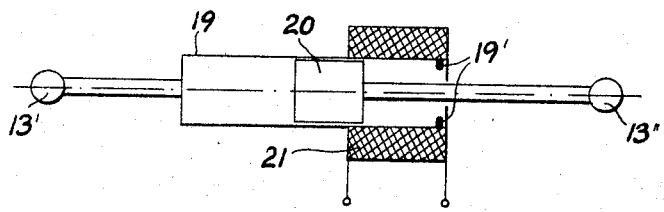
Figure 5:
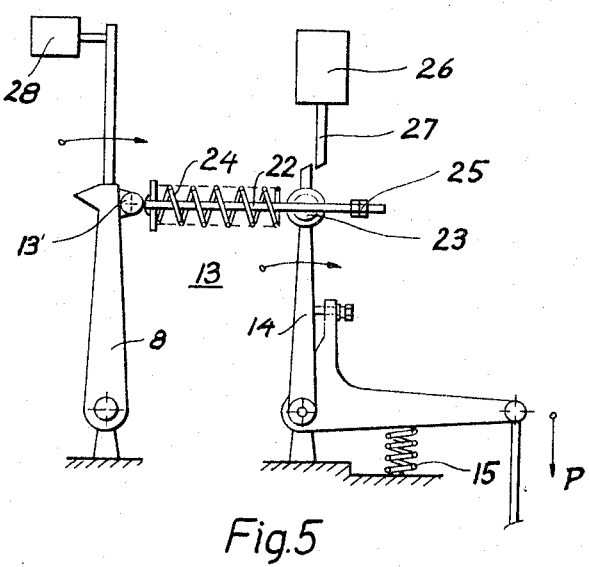

Examples of adjustment devices constructed in accordance with the invention are illustrated in the accompanying drawings in which:

FIGURE 1 shows the whole device diagrammatically;
FIGURE 2 shows diagrammatically one of the control cam discs and its coupling to a hydraulic servo system and
FIGURES 3 to 5 show different examples of couplings which can be used for coupling the cam followers to the servo system.

As shown in FIGURE 1 the adjustment device, for switching the welding machine over to a different transverse wire spacing, is driven by an electric motor 1 which runs continuously. The drive from the motor is taken through a shaft to a pump 2 which delivers oil around a closed circuit containing an electromagnetically actuated spool valve 3 and a hydraulic motor 4.

The hydraulic motor 4 drives, preferably through a worm gear 5, which is represented only diagrammatically in the drawing, an adjustment shaft 6 which adjust the advancing mechanism of the welding machine so as to adjust the spacing between the transverse wires as desired. The controllable pump 2, the hydraulic motor 4 and the intermediate spool valve 3 together constitute the main part of a hydraulic servo system.

The advancing mechanism of the welding machine can be of the usual construction and is not shown in the drawing, which merely shows a pinion wheel 7 which can for example engage with a second pinion on the welding machine for adjusting the stroke of the advancing mechanism.

It may be assumed for example that in order to adjust transverse wire spacing between zero and the maximum the pinion wheel on the welding machine, that is to say the driven pinion, has to be rotated through 60°. In this case the driving pinion 7 preferably gives a reduction of 1:6, to the effect that when the driven pinion is rotated through 60° the driving pinion 7 completes a full rotation through 360°.

The adjustment shaft 6, on which the pinion 7 is mounted, supports in this version of the invention three control cam discs 8a, 8b, 8c (although of course there can be more than three if it is desired to adjust for more than three different transverse wire spacings). The control cam discs rotate with the adjustment shaft 6 and the driving pinion 7. The three control cams all have the same profile and are fixed to the adjustment shaft 6 each adjustable individually at the desired angular position, for example by clamping screws.

Each control cam 8a, 8b, 8c co-operates with a cam follower lever 9a, 9b, 9c. Each cam follower lever acts through a coupling device 10a, 10b, 10c on a control device which controls the pump 2 of the hydraulic servo system. The coupling devices are shown only diagrammatically in FIGURE 1. Each one of the cam discs is capable, by virtue of the shape of its profile and the angle at which it has been fixed to the adjustment shaft 6, of influencing its cam follower lever in such a way that the latter, acting through the coupling device, adjusts the traverse wire spacing on the welding machine as desired. In other words, the spacing is determined by the profile of the cam and by the angle of which the cam is mounted on the adjustment shaft 6. By actuating any one of the coupling devices 10a, 10b, 10c the adjustment mechanism on the welding machine for adjusting the traverse wire spacing can thus be adjusted as desired, that is to say moved to any desired angular position corresponding to the angular position of the particular cam 8a, 8b, 8c on the adjustment shaft 6, and thus the length of the stroke of the advancing mechanism on the welding machine is adjusted to the desired value. As shown in FIGURE 2 a stationary circular scale 11 may be mounted coaxial to the adjustment shaft 6 and the cam disc may have a pointer 12 indicating on the circular scale the angle of rotation reached by the cam disc. Moreover the circular scale may if desired be graduated directly in millimeters to represent the spacing of the welded transverse wires.

FIGURE 2 shows one of the cam discs, its cam follower lever and the device coupling the follower to the servo system. As in FIGURE 1 these parts have also been given the numbers 8, 9 and 10. The profile of the cam 8 is circular around most of its periphery but flattens out at 8' over about ¼ of the periphery. In the middle of the flat part of the curve there is a notch 8". The sharp nose 9' of the cam follower lever 9 follows the curve, and the cam follower lever acts on a coupling member 13 and through a bell-crank lever 14 either on an adjustment device for adjusting the pump 2 (FIGURE 1), or on a delivery control of the pump. The bell-crank lever 14 is shown only partly in FIGURE 2. The coupling member 13 and the lever 14 together constitute the coupling device 10 between the cam follower lever and the servo system. The bell-crank lever 14 is normally held in contact with an adjustable stop 16 by a compression spring 15.

The coupling member 13 is in two parts which are normally free to slide relative to each other, so that the movement of the cam follower lever 9, responding to rotation of the cam 8, does not normally influence the bell-crank lever 14. However a signal reaching the coupling member 13 causes the two parts to slide apart to the maximum distance and locks them relative to each other in this position, as will be described in greater detail below, so that after the arrival of this signal every movement of the cam follower 9 is transmitted to the bell-crank lever 14 and to the servo system, in the form of a control movement.

FIGURE 3 shows one example of the coupling member 13. It consists of a hydraulic cylinder 17, which has an inlet at 17' and an outlet at 17", and a piston 18. The cylinder is pivoted at 13' to the cam follower 9. The piston rod is pivoted at 13" to the bell-crank lever 14. The piston 18 is normally free to move back and forth in the cylinder, but when hydraulic fluid is introduced at 17' the piston is pushed towards the right (FIGURE 3) as far as the end of the cylinder and the two parts of the coupling element 13 are locked in this position relative to each other, so that the two parts 13' and 13" are now rigidly coupled together.

FIGURE 4 shows another example of the coupling member. In this case a guide tube 19 made of non-magnetic material is pivoted at 13' to the cam follower 9. A magnetic core 20 can slide back and forth in the guide tube 19, and to the magnetic core there is attached a connecting rod pivoted at 13" to the bell-crank lever 14. When the coupling member is activated, an electromagnetic coil 21, mounted on the guide tube 19, pulls the core 20 over to the right (FIGURE 4) into contact with the mechanical stop 19'.

In the example shown in FIGURE 5 the coupling member 13 consists of a rod 22 pivoted at 13' to the cam follower lever. The rod is also pivoted at its other end by the guide pivot member 23 attached to the bell-crank lever 14, whereby the rod 22 can slide back and forth in the guide pivot member 23. A compression spring 24 is mounted on the rod 22 between the guide pivot 23 and the pivot 13'. Beyond the guide pivot 23 the rod 22 has a mechanical stop 25. Above the angle lever 14 there is a solenoid 26 to whose core is attached a catch 27 which engages behind the upper end of the lever 14, preventing the latter from moving to the right under the influence of the compression spring 24, which is strongly prestressed and pushes at either end against the two pivots, thus pushing the cam follower lever 9 into contact with its cam disc 8.

As long as the catch 27 prevents the lever 14 from moving the cam follower lever 9 can move back and forth, following the profile of the cam, without influencing the position of the lever 14.

On the other hand when the catch 27 has been retracted by the solenoid 26, the compression spring 24 pushes the guide pivot 23 towards the right against the stop 25 of the rod 22, whereby the lever 14 rocks over to the right, and from then onwards the two levers 9 and 14 are rigidly coupled together.

Thus irrespective of which of the coupling elements shown in FIGURES 3 to 5 is used, it is possible at any time by activating the coupling element to couple the two levers 9 and 14 rigidly together. When this has been done the position of the lever 14 is determined by the position of the cam follower lever 9 on its cam disc 8. When the sharp nose 9' of the cam follower lever follows the raised part of the cam 8 the servo system receives the maximum control signal and the adjustment shaft 6 is turned at full speed by the hydraulic motor 4. When the sharp nose 9' of the cam follower lever 9 reaches the flat part 8' of the cam profile, the lever 14 gradually reduces the control signal supplied to the servo system. Finally when the sharp nose 9' of the cam follower lever engages with the notch 8" the hydraulic circuit is interrupted and the hydraulic motor 4 is stopped. At this instant the advancing mechanism of the welding machine is adjusted to give the desired length of stroke.

When the spacing has been adjusted the coupling member 13 is de-activated and the coupling between the cam follower lever and the servo system is interrupted. In the examples of FIGURES 3 and 4 the coupling member is de-activated by releasing the pressure in the hydraulic cylinder 17, or by interrupting the flow of electric current through the electromagnet 21. On the other hand, in the version of FIGURE 5 the coupling member is de-activated by interrupting the current flowing through the solenoid 26, whereby the catch 27 once more engages behind the end of the lever 14, preventing it from moving to the right. In the version of FIGURE 5 the mechanical stop 25 on the rod 22 is adjusted in position so that when the sharp nose 9' of the cam follower lever 9 engages in the notch 8" of the cam 8 the lever 14 is exactly in its initial position as shown in FIGURE 5, so that the catch 27 can engage just behind the lever 14. De-activation of the coupling member 13 is preferably effected by means of the limit switch 28 which is operated by an extension of the cam follower lever 9 when the sharp nose 9' engages with the notch 8".

In order to be able either to increase or decrease the spacing of the transverse wires in the welding machine, the servo system must be capable of acting in both these senses. For this purpose there is provided an electromagnetically controlled spool valve or the like 3 which is positioned in the middle of the hydraulic circuit. In one end position of the slider the hydraulic ducts connect the pump 2 directly to the motor 4, whereas in the other end position of the slider the hydraulic ducts cross over so that the direction of rotation of the hydraulic motor is reversed. When a particular cam has been selected by the control mechanism, whereby for example the electromagnet 26 (FIGURE 5) is activated, an electric signal can be given, by already known means, which indicates whether the previously used transverse wire spacing was greater or smaller than the spacing now required. This signal can then be used to activate electromagnets which change the position of the slider 3, in one direction or the other.

The arrangement is preferably such that the cams 8a to 8c are mounted to give a series in the direction of greater wire spacing, so that when the coupling members are activated one after the other the position of the particular cam along the adjustment shaft 6 also represents the direction in which the spool valve 3 has to be moved. Thus for example when changing from a smaller wire spacing to a greater wire spacing the slide valve is automatically changed to give a direct passage for the hydraulic fluid, whereas when the change is made from a greater to a smaller wire spacing the slider is moved in the opposite direction to give crossed-over passages for the hydraulic fluid. The drawings do not show the control circuits for these operations, because their arrangement will be obvious to anyone familiar with the art. In this example the spool valve 3 is moved, after the completion of each control operation, into its central position blocking the hydraulic flow, by an electric control circuit containing the limit switch of the particular cam disc, for example the limit switch E in FIGURE 3.

A modern wire mesh welding machine is capable of welding about 50 transverse wires per minute and the adjustment for changing over to a different transverse wire spacing must be completed during the period taken by the advancing mechanism to perform its return stroke, ready to grip the next welded transverse wire and advance it through the required distance. In the present example this interval of time is only about $\frac{1}{100}$ of a minute. The switching operation must therefore take place very quickly, and yet the next spacing must be accurate. The mechanical parts of the switching mechanism must therefore move abruptly but must be brought to a stop gradually. This gradual stopping of the movements is provided by the flattening out 8' of the cam curve on the cams 8, whereby the hydraulic fluid is gradually throttled back in the servo system before being finally stopped.

The invention is particularly suitable for use in conjunction with a programming system, which delivers controlling signals to the individual members which effect the adjustment, for example to the electromagnet 26 in FIGURE 5 which retracts the catch 27 and thus couples the cam follower to the servo system and which delivers a control signal at the same time to move the slider 3 to obtain the desired direction of rotation of the motor 4.

This programming control is preferably provided by a punched tape system. The tape has several tracks, one for each cam disc. The transport mechanism for the punched tape is preferably coupled to the welding machine in such a way that each working stroke of the advancing mechanism corresponds to a switching step on the tape.

For example suppose that the program requires to begin with the welding of 7 transverse wires spaced 40 mm. apart, and then 10 transverse wires spaced 200 mm. apart, and then finally further transverse wires welded 40 mm. apart again. The cam 8a is adjusted in position to give a spacing of 40 mm., and the cam 8b is adjusted to give a spacing of 200 mm. The working process is initiated by a hole in the first track on the punched tape. Seven switching steps later a hole in the second track gives a spacing of 200 mm. between the seventh and the eighth transverse wire, for example by means of a pulse sent to the electromagnet 26 and sent simultaneously to the slide valve 3 (FIGURE 1), which pushes the slider 3 to the left. When it is required to reduce the spacing back to 40 mm., ten switching steps later, a hole in the first track on the tape delivers a further pulse to the electromagnet 26 of the cam disc 8a, and simultaneously to the electromagnet of the slide valve 3, causing the slider 3 to move back again to the right.

Various modifications are possible. One can use, for example, instead of cam discs, face cams, and the coupling members with their system of levers and links can be varied to suit the particular kind of servo system used. Moreover the programming can be effected by other methods, for example by magnetic tape, films, or by toothed cam discs.

What we claim is:
1. An adjustment device for changing the transverse wire spacing in the manufacture of welded wire mesh and for fitting to a wire mesh welding machine of the kind which welds longitudinal and transverse wires together at their crossover points, the longitudinal wires being advanced intermittently through the machine by an advancing mechanism which has grippers which grip each welded transverse wire and advances through the required distance and then return to grip the next welded transverse wire, and the working stroke of the advancing mechanism, which determines the spacing between the welded transverse wires, being determined by the adjustable angular orientation of a shaft of the adjustment device, the adjustment device comprising the shaft on which there are mounted two or more angularly adjustable cam discs each of which co-operates with a separate cam follower and is capable of controlling the adjustment to the angular position of the shaft to determine the length of the advancing stroke of a welding machine to which the device is in use fitted, the cam followers being coupled to a servo system which rotates the shaft through an angle and to a predetermined angular orientation dependent on the shape of the control cams and their angular setting on the shaft, the couplings between the cam followers and the servo system being arranged to be rendered individually operative or inoperative by a master control so that the angular setting of the shaft at any time is dependent only on which of the cam followers is operatively connected to the servo system.

2. A device according to claim 1, in which each coupling includes two parts which are normally capable of sliding freely relative to each other so that the coupling is inoperative but which are arranged to be forced apart and locked in their extended position to provide an operative coupling.

3. A device according to claim 2, in which each coupling comprises a hydraulic cylinder and a piston which is capable of being pushed by fluid pressure out of the cylinder as far as a mechanical stop to provide the extended position.

4. A device according to claim 2, in which the coupling comprises an electromagnetic core and an electromagnet for moving the core outwards upon energisation of the magnet as far as a mechanical stop to provide the extended position.

5. A device according to claim 2, in which the coupling comprises a connecting rod which passes through a guide pivot with a compression spring on one side of the guide pivot and a mechanical stop mounted on the rod on the other side of the guide pivot.

6. A device according to claim 5, in which there is a releasable catch which is arranged to hold the guide pivot at a distance away from the mechanical stop on the rod.

7. A device according to claim 1, in which each cam follower has a limit switch which, when the cam follower is in one extreme position, renders the corresponding coupling inoperative.

8. A device according to claim 1, in which each control cam has a curve which is substantially circular over the greater part of the periphery and a flatter part extending over the rest of the periphery, and in the middle of the flatter part there is a notch, the cam follower having a sharp nose which follows the periphery and can engage in the notch.

9. A device according to claim 1, in which the servo system is hydraulic and the hydraulic circuit of the system incorporates an automatically actuable spool valve for reversing the direction of flow of the hydraulic fluid through a hydraulic motor which drives the shaft.

10. A device according to claim 1, in which there is a programming system providing the master control.

11. A device according to claim 10, in which the programming system is a punched tape system.

12. A device according to claim 11, in which the control system is arranged to be used with a tape having a separate track for each control cam.

13. A device according to claim 11, in which a transport mechanism for the tape is coupled to the drive of the advancing mechanism of the welding machine in such a way that each complete stroke of the advancing mechanism causes the tape to be advanced by one switching step.

14. A wire mesh welding machine of the kind described fitted with an adjustment device in accordance with claim 1, in which a change in the working stroke of the advancing mechanism is associated with rotation of a rotary element driven by the shaft of the adjustment device the maximum range of rotation of the rotary element being less than 360° and the shaft being connected to the rotary element through a reduction gearing so that the maximum range of rotation of the shaft is 360° and the full surfaces of the cams are usefully employed.

References Cited

UNITED STATES PATENTS

| | | | |
|---|---|---|---|
| 2,736,347 | 2/1956 | Kaunitz | 140—112 |
| 2,987,081 | 6/1961 | Stone | 140—112 |
| 3,010,493 | 11/1961 | Fingerut | 140—112 |
| 3,083,741 | 4/1963 | De Poy | 140—112 |
| 3,213,898 | 10/1965 | Le Grady et al. | 140—112 |

CHARLES W. LANHAM, *Primary Examiner.*

L. A. LARSON, *Assistant Examiner.*

U.S. Cl. X.R.

72—7; 219—56